United States Patent [19]
Wolfe et al.

[11] Patent Number: 5,207,948
[45] Date of Patent: May 4, 1993

[54] STIR-IN FLUORESCENT LAMP PHOSPHOR AND METHOD OF MAKING SAME

[75] Inventors: Robert W. Wolfe; Joseph J. Lenox, both of Towanda; Theodore J. Tomlinson, Canton, all of Pa.

[73] Assignee: GTE Products Corporation, Stamford, Conn.

[21] Appl. No.: 656,342

[22] Filed: Feb. 11, 1991

[51] Int. Cl.⁵ .................. C09K 11/02; B05D 5/06; B32B 5/16
[52] U.S. Cl. .................. 252/301.36; 313/485; 313/486; 427/67; 427/157; 427/221; 428/407
[58] Field of Search .................. 252/301.36; 427/67, 427/221, 157; 428/407; 313/485, 486

[56] References Cited

U.S. PATENT DOCUMENTS

| | | | |
|---|---|---|---|
| 4,049,845 | 9/1977 | Lozier | 427/68 |
| 4,206,250 | 6/1980 | Oba | 252/301.36 |
| 4,661,535 | 4/1987 | Borroff | 128/90 |
| 4,806,389 | 2/1989 | Peters et al. | |
| 4,859,497 | 8/1989 | Wolfe | 427/68 |

FOREIGN PATENT DOCUMENTS 53-14983 2/1978 Japan.

Primary Examiner—Jerry Johnson
Attorney, Agent, or Firm—Elizabeth A. Levy

[57] ABSTRACT

A stir-in fluorescent lamp phosphor is coated with a 1:1 ratio of latex polymer and fumed silica. The polymer-coated fluorescent lamp phosphor exhibits improved dispersability and wettability in aqueous and organic binder media which are used to apply fluorescent lamp phosphors to the inside walls of a fluorescent lamp envelope.

9 Claims, No Drawings

STIR-IN FLUORESCENT LAMP PHOSPHOR AND METHOD OF MAKING SAME

TECHNICAL FIELD

This invention relates to a method for coating particles of a fluorescent lamp phosphor with a polymer to prevent agglomeration and improve dispersability of the phosphor in aqueous and organic binder media. More particularly, the invention relates to a method of coating a magnesium tungstate fluorescent lamp phosphor.

BACKGROUND OF THE INVENTION

Fluorescent lamp phosphors which emit white light may be comprised of phosphors which emit in the red, blue and green spectral regions. Magnesium tungstate is a blue-emitting fluorescent lamp phosphor which may be blended with manganese-activated zinc silicate, a green-emitting fluorescent lamp phosphor, and tin-activated strontium orthophosphate, a red-emitting fluorescent lamp phosphor, to produce a white-emitting fluorescent lamp phosphor.

The interior surface of a fluorescent lamp envelope is coated with a phosphor which has been suspended in an organic or aqueous binder. Many fluorescent lamp phosphors, including manganese-activated zinc silicate and tin-activated strontium orthophosphate, are readily dispersed in such binders and are said to have "stir-in" capability. However, some fluorescent lamp phosphors, such as magnesium tungstate, have a very fine particle size and tend to agglomerate when mixed into the binder. Because of this tendency to agglomerate, the binder suspension containing such phosphors must be milled to provide a smooth coating on the inside walls of a fluorescent lamp envelope. Such milling adds time and expense to the phosphor manufacturing and blending process.

It would be an advancement in the art to eliminate the milling requirement by providing a method for improving the dispersability of fine fluorescent lamp phosphors in aqueous and organic binder suspensions.

Latex polymers and copolymers have been used with cathode ray tube phosphors as binding agents to bind pigments to the phosphor particles. The pigments act as a filter to improve the color purity and contrast of the emitted light. U.S. Pat. No. 4,859,497 to Wolfe et al. describes a method of coating a silver-activated zinc sulfide cathode ray tube phosphor with a latex polymer to bind pigments to the phosphor particles and impart stir-in capabilites thereto.

SUMMARY OF THE INVENTION

It is an object of this invention to provide a method of improving the dispersability and wettability of fine fluorescent lamp phosphor particles in aqueous and organic binder media.

According to one aspect of the invention, there is provided a method of making a stir-in fluorescent lamp phosphor, comprising the steps of: forming an aqueous slurry of the phosphor, a latex polymer and fumed silica; stirring the slurry to form a uniform dispersion of solid particles in an aqueous suspension; separating the solid particles from the aqueous suspension; and drying and screening the solid particles to form a stir-in polymer-coated fluorescent lamp phosphor.

According to another aspect of the invention, there is provided a stir-in fluorescent lamp phosphor coated with a 1:1 ratio of a latex polymer and fumed silica, the latex polymer and the fumed silica each comprising 0.5 weight percent of the phosphor, the latex polymer being selected from the group consisting of acrylic polymers, styrene/acrylic copolymers, and carboxylated acrylate acrylonitrile copolymers.

DETAILED DESCRIPTION OF THE INVENTION

Some fluorescent lamp phosphors have very fine and/or irregularly shaped particles. For example, the particles of magnesium tungstate fluorescent lamp phosphor are very fine and have a shape which resembles a kernel of popcorn, with many surfaces and cavities. Magnesium tungstate phosphor has a low bulk density because its irregularly shaped particles cannot be closely packed. It is believed that magnesium tungstate phosphor particles agglomerate either because of hydrogen bonding between particles or the presence of surface electrostatic charges which tend to attract particles to one another. This tendency of magnesium tungstate phosphor to agglomerate results in poor dispersion of the phosphor in liquid binder vehicles.

The method of the invention involves the formation of a polymer coating on the particle surfaces of a fluorescent lamp phosphor to prevent agglomeration of the phosphor in organic and aqueous binder media. A latex polymer and fumed silica are added to an aqueous slurry of the phosphor so that there is a 1:1 ratio of polymer solids to silica. The slurry is stirred until a uniform dispersion is obtained. The liquid is then separated from the solids by decantation. The resulting solids are dried and screened to produce polymer-coated fluorescent lamp phosphor particles consisting of about 0.5 percent by weight polymer and about 0.5 percent by weight silica. Dispersability of the polymer-coated fluorescent lamp phosphor in both aqueous and organic binder media is vastly improved, resulting in a smooth, even phosphor coating on the inside walls of a fluorescent lamp envelope. Costly and time-consuming milling of the phosphor in the liquid binder is no longer necessary when the method of this invention is followed.

A latex is an aqueous colloidal suspension of at least one organic polymer or copolymer. The amount and type of latex polymer is not critical to the method of the invention. It has been determined that from about 0.2 to 2.0 percent polymer by weight of phosphor is sufficient to impart good dispersion properties. Anionic latex polymers are preferred. Some latex polymers which give acceptable results include: 1) a carboxylated acrylate acrylonitrile copolymer manufactured by Reichold under the name of Synthemul DL-0685; 2) a styrene/acrylic copolymer manufactured by Union Carbide Corp. under the name of UNOCAL RES1018; and 3) an acrylic polymer manufactured by Rohm & Haas Co. under the name of Rhoplex B-85.

Every polymer has a glass transition temperature ($T_g$) below which it behaves as a hard, brittle, rigid solid and above which it behaves as a viscous, plastic solid. Polymers which have a $T_g$ of lower than about 20° C. may be quite gummy or tacky at ambient temperatures. It has been determined that the addition of fumed silica to the latex reduces the tackiness of the polymer at ambient temperatures and allows the latex to coat the phosphor particles without itself agglomerating or clumping. Fumed silica is a very fine silica powder which has been sprayed, or fumed, through a flame during its manufacturing process. It acts to reduce the tackiness or binding tendency of a latex polymer. A 1:1 ratio of polymer solids to fumed silica solids is sufficient for satisfactory coating of the phosphor with the latex polymer. Thus, from about 0.2 to 2.0 percent fumed silica by weight of the phosphor is sufficient to reduce the tackiness of the latex polymer so that satisfactory dispersion properties are obtained.

Every latex has a characteristic Minimum Film Formation Temperature (MFFT) at which the latex dries to form a continuous, nonporous film. After the suspension containing the phosphor, polymer and silica has been separated into a liquid portion and a solids portion, the solids are dried at a temperature in excess of the MFFT of the latex polymer. Drying is usually done at a temperature of at least 110° C. and preferably between 130° C. and 160° C., for at least one hour or for a sufficient time to drive off residual moisture and form a polymer film over the phosphor particles. The dried phosphor cake is then dry-screened to produce a stir-in polymer-coated fluorescent lamp phosphor.

The following non-limiting example is presented.

EXAMPLE I

Two kilograms of magnesium tungstate blue-emitting fluorescent lamp phosphor (Sylvania Type 2301, available from GTE Products Corporation, Chemical and Metallurgical Division, Towanda, PA) were slurried in 8 liters of deionized water. To the slurry were added 76 milliliters (0.132 grams solids/milliliter) of acrylic latex polymer (Rhoplex B-85, available from Rohm & Haas Co.) and 10 grams of fumed silica (OX-50, available from Degussa, Inc.). The resulting mixture was stirred for 20 minutes and the solids allowed to settle. The supernatant liquid was decanted and the remaining slurry washed twice with hot deionized water. The phosphor was then filtered from the wash water and dried for at least 1 hour at 140° C.

The polymer coating consisted of 0.5 weight percent acrylic polymer and 0.5 weight percent fumed silica. The dried phosphor cake was dry-screened and then dry-blended with manganese-activated zinc silicate and tin-activated strontium orthophosphate. The resulting phosphor blend was then stirred into an aqueous binder which was then applied to the interior surface of a fluorescent lamp envelope to produce a smooth, uniform phosphor coating.

Forty-watt fluorescent lamps were prepared using a phosphor blend containing the polymer-coated phosphor of Example I and a blend containing uncoated magnesium tungstate phosphor. No milling of the phosphor blend containing the coated phosphor of Example I was required to obtain a satisfactory phosphor coating. The light output and maintenance values for the blend containing the polymer-coated phosphor were equivalent to those for the blend containing the uncoated phosphor.

While there has been shown and described what at present are considered the preferred embodiments of the invention, it will be obvious to those skilled in the art that various changes and modifications may be made therein without departing from the scope of the invention as defined by the appended claims.

What is claimed is:

1. A method of making a stir-in magnesium tungstate phosphor, comprising the steps of:
    a) forming an aqueous slurry of said phosphor, a latex polymer and fumed silica;
    b) stirring said aqueous slurry to form a uniform dispersion of solid particles in an aqueous suspension;
    c) separating said solid particles from said aqueous suspension; and
    d) drying and screening said solid particles to form a stir-in polymer-coated magnesium tungstate phosphor.

2. The method of claim 1 wherein said latex polymer is selected from the group consisting of acrylic polymers, styrene/acrylic copolymers, and carboxylated acrylate acrylonitrile copolymers.

3. The method of claim 1 wherein said latex polymer is an acrylic latex polymer.

4. The method of claim 1 wherein said latex polymer comprises from 0.2 to 2.0 weight percent of said polymer-coated phosphor.

5. The method of claim 1 wherein said fumed silica comprises from 0.2 to 2.0 weight percent of said polymer-coated phosphor.

6. The method of claim 1 wherein said latex polymer is anionic.

7. The method of claim 1 wherein said solid particles are dried at 130° C. to 160° C. for at least one hour.

8. The method of claim 7 wherein said solid particles are dried at 140° C. for at least one hour.

9. A stir-in magnesium tungstate phosphor comprising magnesium tungstate phosphor coated with a 1:1 ratio of a latex polymer and fumed silica, said latex polymer and said fumed silica each comprising 0.5 weight percent of said phosphor, said latex polymer being selected from the group consisting of acrylic polymers, styrene/acrylic copolymers, and carboxylated acrylate acrylonitrile copolymers.

* * * * *